(12) United States Patent
Kato et al.

(10) Patent No.: US 12,481,669 B1
(45) Date of Patent: Nov. 25, 2025

(54) EXTRACTING DATA TO POPULATE TABLES FROM NATURAL LANGUAGE COMMUNICATIONS

(71) Applicant: Amazon Technologies, Inc., Seattle, WA (US)

(72) Inventors: Shinichi Kato, Kensington, CA (US); Rajesh Goli, Fremont, CA (US); Yassine Benajiba, Briarcliff Manor, NY (US); Raghavendraprasad Raghunathprasad, Redmond, WA (US); Miguel Ballesteros Martinez, New York, NY (US); Roger Scott Jenke, Seattle, WA (US); Saurabh Giri, Sammamish, WA (US); Dan Roth, Philadelphia, PA (US); Rama Krishna Sandeep Pokkunuri, Redmond, WA (US); Atul Deo, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/810,310

(22) Filed: Jun. 30, 2022

(51) Int. Cl.
| | |
|---|---|
| *G06F 15/16* | (2006.01) |
| *G06F 16/22* | (2019.01) |
| *G06F 16/25* | (2019.01) |
| *G06F 40/40* | (2020.01) |
| *G06N 20/00* | (2019.01) |

(52) U.S. Cl.
CPC ........ *G06F 16/254* (2019.01); *G06F 16/2282* (2019.01); *G06F 40/40* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 8,832,205 B2 | 9/2014 | Nelson et al. | |
| 9,606,977 B2 | 3/2017 | Subramanya et al. | |
| 2017/0092264 A1* | 3/2017 | Hakkani-Tur | G10L 15/16 |
| 2017/0147552 A1* | 5/2017 | Carroll | G06V 10/44 |
| 2019/0258585 A1* | 8/2019 | Marcu | G06F 12/0246 |
| 2019/0286620 A1* | 9/2019 | Al-Haimi | G06F 16/211 |
| 2020/0090033 A1* | 3/2020 | Ramachandran | G06F 16/24522 |
| 2020/0242151 A1* | 7/2020 | Adlersberg | G06F 16/483 |
| 2021/0081614 A1* | 3/2021 | Kakadiya | G06N 5/025 |
| 2022/0115020 A1* | 4/2022 | Bradley | G06F 3/0334 |

(Continued)

OTHER PUBLICATIONS

Jonathan Herzig, et al., "TAPAS: Weakly Supervised Table Parsing via Pre-training," Proceedings of the 58th Annual Meeting of the Association for Computational Linguistics, pp. 4320-4333, Jul. 5-10, 2020, Association for Computational Linguistics.

(Continued)

*Primary Examiner* — Alex Gofman
(74) *Attorney, Agent, or Firm* — S. Scott Foster; Kowert, Hood, Munyon, Rankin & Goetzel, P.C.

(57) ABSTRACT

Extraction of portions of natural language communications is performed to populate tables. An obtained communication may be associated with one, or more tables. The communication may include natural language data which may extracted and evaluated to predict different value mappings to the table. The value mappings may be confirmed or automatically made to the table.

20 Claims, 9 Drawing Sheets

(56) References Cited

U.S. PATENT DOCUMENTS

2022/0309411 A1* 9/2022 Ramaswamy ....... G06Q 10/067
2022/0391453 A1* 12/2022 Kewalramani ....... G06F 40/284

OTHER PUBLICATIONS

Qing Lyu, et al., "Zero-shot Event Extraction via Transfer Learning: Challenges and Insights," ACL 2021, pp. 1-11.

* cited by examiner

EXTRACTING DATA TO POPULATE TABLES FROM NATURAL LANGUAGE COMMUNICATIONS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the number, size and complexity of data storage and management technologies that are used to perform various operations and services, such as utilizing the features of database systems, object stores, and data streams, which in turn escalate the cost of maintaining the information.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of extracting data from natural language communications to populate tables are described herein. Tables (sometimes stored as spreadsheets or edited by spread sheet applications) are often relied upon to track the states of various tasks, operations, or other applications. Often, the source of the data for these tables is taken from communications, such as email, which are not structured and stated in natural language and therefore are not able to be interpreted by database systems, ETL systems, or other data processing systems natively. Techniques for extracting data from natural language communications to populate tables may be implemented in various embodiments facilitate extraction of natural language data from communications to be recorded in tables. In this way, error-prone and time consuming copy techniques can be avoided and the interoperability between different systems (e.g., communication systems with data storage systems) can be increased.

Figure 1:
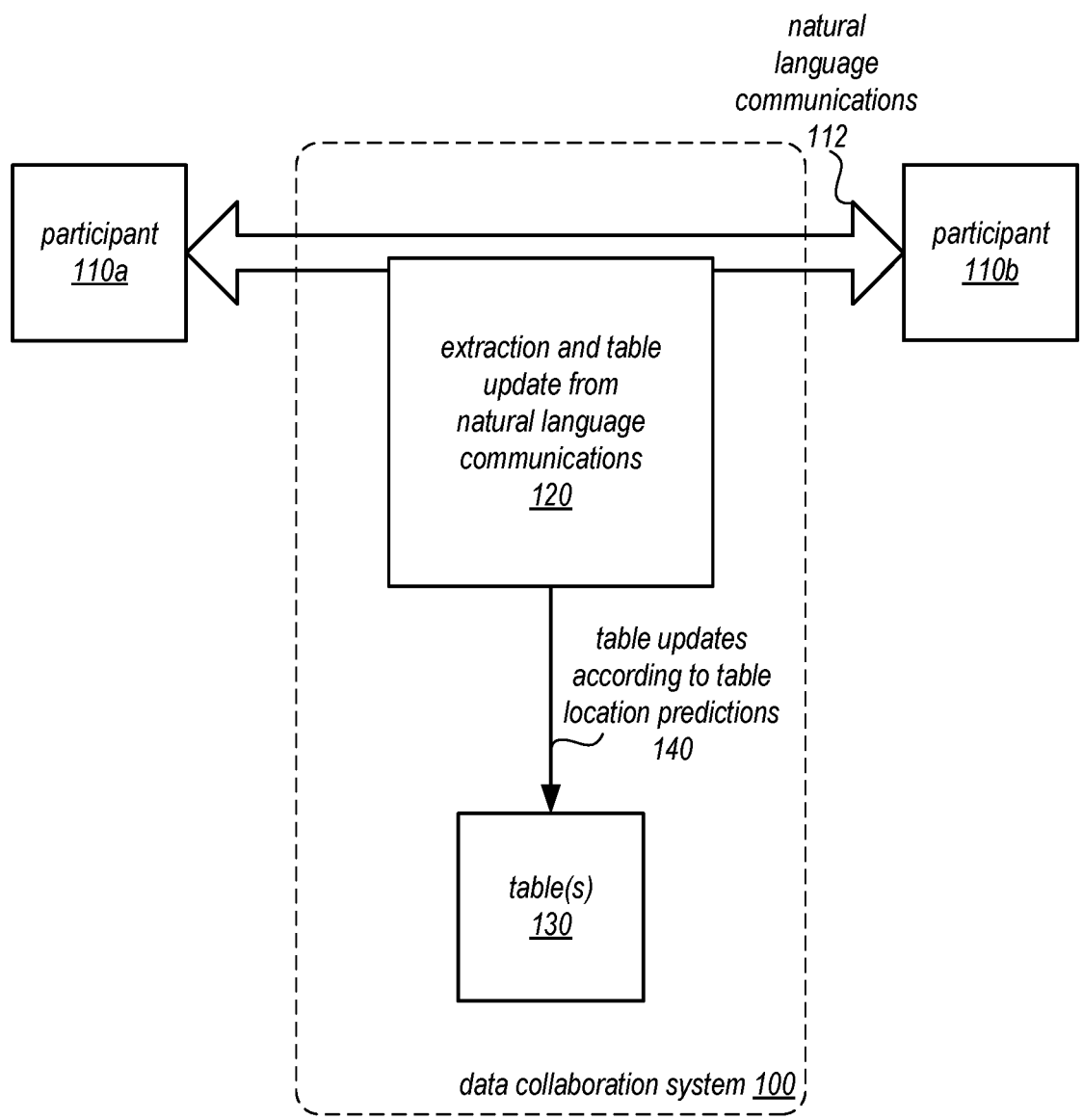
FIG. 1 illustrates a logical block diagram illustrating extracting data from natural language communications to populate tables, according to some embodiments.

FIG. 1 illustrates a logical block diagram illustrating extracting data from natural language communications to populate tables, according to some embodiments. Data collaboration system 110 may be a standalone system or implemented as part of a set of service offering from a provider network, such as data collaboration service 210 discussed below with regard to FIG. 2. One aspect of data collaboration system 100 may be the use of tables, such as table(s) 130, to store, track, record, or otherwise maintain state for various use-cases, operations, tasks, or other scenarios in which multiple participants are collaborating. These table(s) 130 may be defined through requests to create the table, as well as specify features of the table, such as the columns, including the column names and types of column data to be stored.

In some embodiments, participants, such as participants 110a and 110b may communicate about the use-cases, operations, tasks, or other scenarios that are being tracked by table(s) 130. Instead of requiring participants 110 to record relevant information manually in table(s) 130, which can be prone to error, as well as making them become unable to keep up with the number of updates to be made in scenarios with large numbers of participants, extraction and table update from natural language communications 120 may be implemented. Natural language communications 112 may take various forms (e.g., electronic mail (e-mail), message systems (e.g., SMS, MMS, or other mobile device message or account based message communication technologies), posts or communications recorded message boards, chat channels, or various other communication systems or applications that may be used by different participants to share and collaborate on various tasks) and include natural language (e.g., human readable text that follows human grammar rules, structure, and syntax). As discussed in detail below with regard to FIGS. 3-8, natural language communications 120 may extract, evaluate, and in various ways, perform table updates according to table location predictions, as indicated 140. In this way, the communications 112 themselves may prove authoritative for determining the content of one or more table(s) 130 without participants entering or accessing the table(s) 130 directly. As communications may include more than one-way exchanges (e.g., request and response, clarification request, and response, etc.), extraction and table update from natural language communications 120 may also incorporate the context of natural language communications 112 (as well as provide opportunities for participants 110b to clarify information). Moreover, associated data objects, such as files, images, audio recordings, links, or other information that is include with, referenced by, attached to, or otherwise associated with natural language communications 112 can be incorporated into the table updates to be performed at 140.

Please note that the previous description of extracting data from natural language communications to populate tables is a logical illustration and thus is not to be construed as limiting as to the implementation of natural language query processing systems 110, or various other features, like data sets 122. Different combinations or implementations may be implemented in various embodiments.

This specification begins with a general description of a provider network that implements a data collaboration service that supports extracting data from natural language communications to populate tables. Then various examples of natural language processing for extracting data to populate tables including different components, or arrangements of components that may be employed as part of implementing the data collaboration service are discussed. A number of different methods and techniques to implement extracting data from natural language communications to populate tables are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
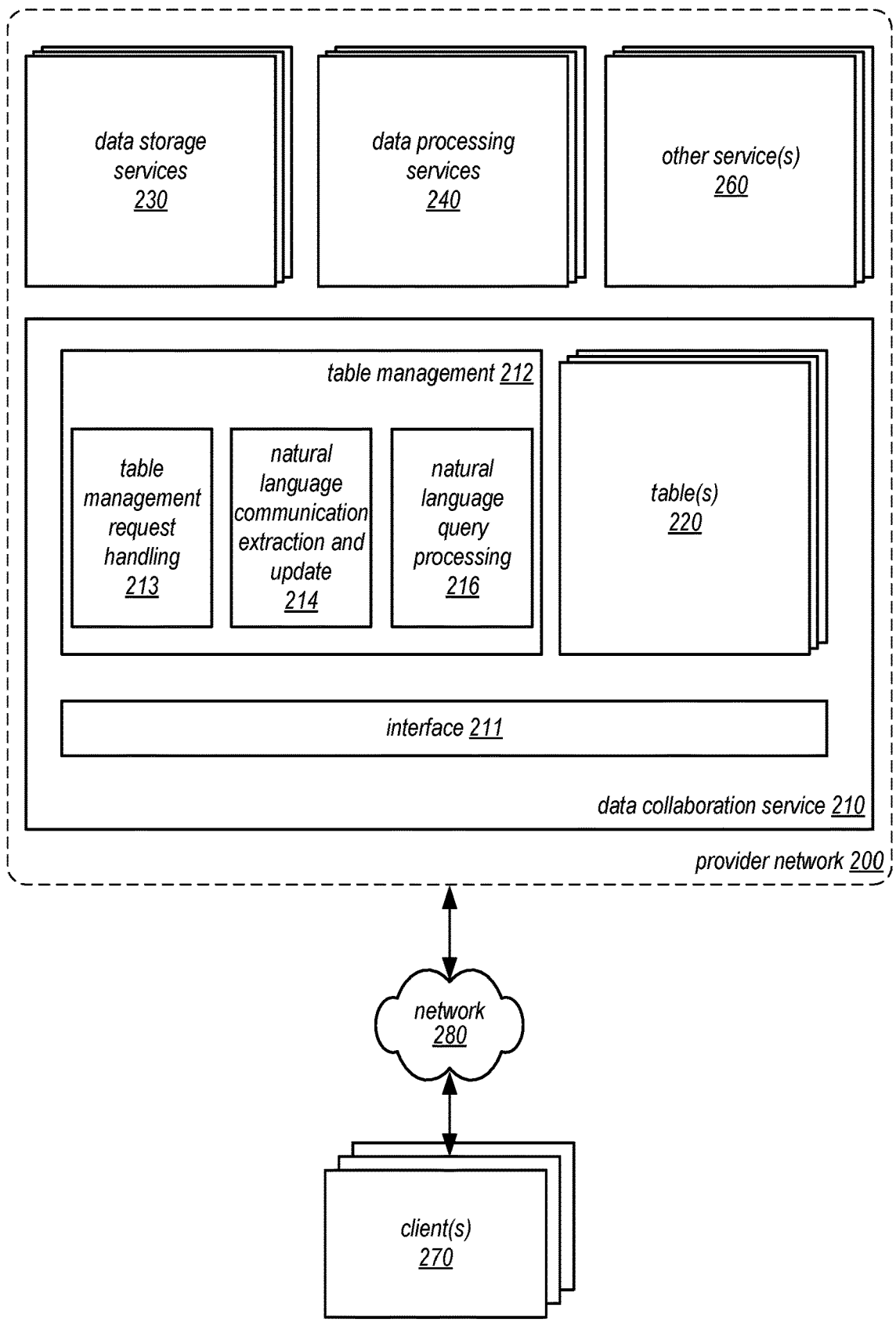
FIG. 2 is a logical block diagram illustrating a provider network offering a data collaboration service that implements extracting data from natural language communications to populate tables, including various data storage and processing services, according to some embodiments.

FIG. 2 is a logical block diagram illustrating a provider network offering a data collaboration service that implements extracting data from natural language communications to populate tables, including various data storage and processing services, according to some embodiments. Provider network 200 may be a private or closed system or may be set up by an entity such as a company or a public sector organization to provide one or more services (such as various types of cloud-based storage) accessible via the Internet and/or other networks to clients 270, in some embodiments. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may implement various computing systems, platforms, resources, or services, such as a data collaboration service 210, compute services, data storage service(s) 230, (e.g., relational or non-relational (NoSQL) database query engines, map reduce processing, data flow processing, and/or other large scale data processing techniques, block-based storage service, or data storage service that may store different types of data for centralized access), data processing services 240, such as data stream and/or event services, and other services (any other type of network based services (which may include various other types of storage, processing, analysis, communication, event handling, visualization, and security services not illustrated), including other service(s) 260 that provide or analyze data for access by data collaboration service 210.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

In various embodiments, data collaboration service 210 may provide a scalable, serverless, and machine-learning powered service to implement various table-based collaboration scenarios where tables track the state of various operations, tasks, events, or other uses cases. Data collaboration service 210 may implement interface 211, which may be implemented as various types of programmatic (e.g., Application Programming Interfaces (APIs)), command line, and/or graphical user interfaces to support the management of tables, including automatic population from associated communications, and/or perform natural language queries, as discussed below.

Data collaboration service 210 may implement table management 212, in various embodiments. Table management 212 may allow users to create, update, and query tables for various use cases, as discussed in detail below with regard to FIGS. 3-8. For example, table management request handling 213 may support the creation of tables, while natural language query processing 216 may support natural language queries to obtain data from tables (and/or identify tables). Natural language communication extraction and update 214 may be implemented to extract natural language data from communications associated with a table and populate (or propose recommendations to populate) locations in the table.

In various embodiments, data storage services 230 may be various types of data processing services that perform general or specialized data processing functions (e.g., analytics, big data querying, time-series data, graph data, document data, relational data, structured data, or any other type of data processing operation) over data that is stored across multiple storage locations, in some embodiments. For example, in at least some embodiments, data storage services 210 may include various types of data storage services (e.g., relational) for storing, querying, and updating data. Such services may be enterprise-class database systems that are scalable and extensible. Queries may be directed to a database in data storage service(s) 230 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, data storage services 220 may be various types of data processing services to perform different functions (e.g., query or other processing engines to perform functions such as anomaly detection, machine learning, data lookup, or any other type of data processing operation). For example, in at least some embodiments, data storage services230 may include a map reduce service that creates clusters of processing nodes that implement map reduce functionality over data stored in one of data storage services 240. Various other distributed processing architectures and techniques may be implemented by data storage services 230 (e.g., grid computing, sharding, distributed hashing, etc.). Note that in some embodiments, data processing operations may be implemented as part of data storage service(s) 230 (e.g., query engines processing requests for specified data).

Data storage service(s) 230 may implement different types of data stores for storing, accessing, and managing data on behalf of clients 270 as a network-based service that enables clients 270 to operate a data storage system in a cloud or network computing environment. For example, one data storage service 230 may be implemented as a centralized data store so that other data storage services may access data stored in the centralized data store for processing and or storing within the other data storage services, in some embodiments. Such a data storage service 240 may be implemented as an object-based data store, and may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A data storage service 240 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In various embodiments, data stream and/or event services may provide resources to ingest, buffer, and process streaming data in real-time, which may be a source of data sets. In some embodiments, data stream and/or event services may act as an event bus or other communications/ notifications for event driven systems or services (e.g., events that occur on provider network 200 services and/or on-premise systems or applications).

Generally speaking, clients 270 may encompass any type of client configurable to submit network-based requests to provider network 200 via network 280, including requests for materialized view management platform 210 (e.g., a request to create a materialized view from different data sources of the other provider network services and identify one or more as a target data source). For example, a given client 270 may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application may interact directly with provider network 200. In some embodiments, client 270 may generate network-based services requests according to a Representational State Transfer (REST)-style network-based services architecture, a document- or message-based network-based services architecture, or another suitable network-based services architecture.

In some embodiments, a client 270 may provide access to provider network 200 to other applications in a manner that is transparent to those applications. For example, client 270 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 270 and the operating system or file system on behalf of applications executing within the operating system environment.

Clients 270 may convey network-based services requests (e.g., natural language queries) to and receive responses from provider network 200 via network 280. In various embodiments, network 280 may encompass any suitable combination of networking hardware and protocols necessary to establish network-based-based communications between clients 270 and provider network 200. For example, network 280 may generally encompass the various telecommunications networks and service providers that collectively implement the Internet. Network 280 may also include private networks such as local area networks (LANs) or wide area networks (WANs) as well as public or private wireless networks. For example, both a given client 270 and provider network 200may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Figure 3:
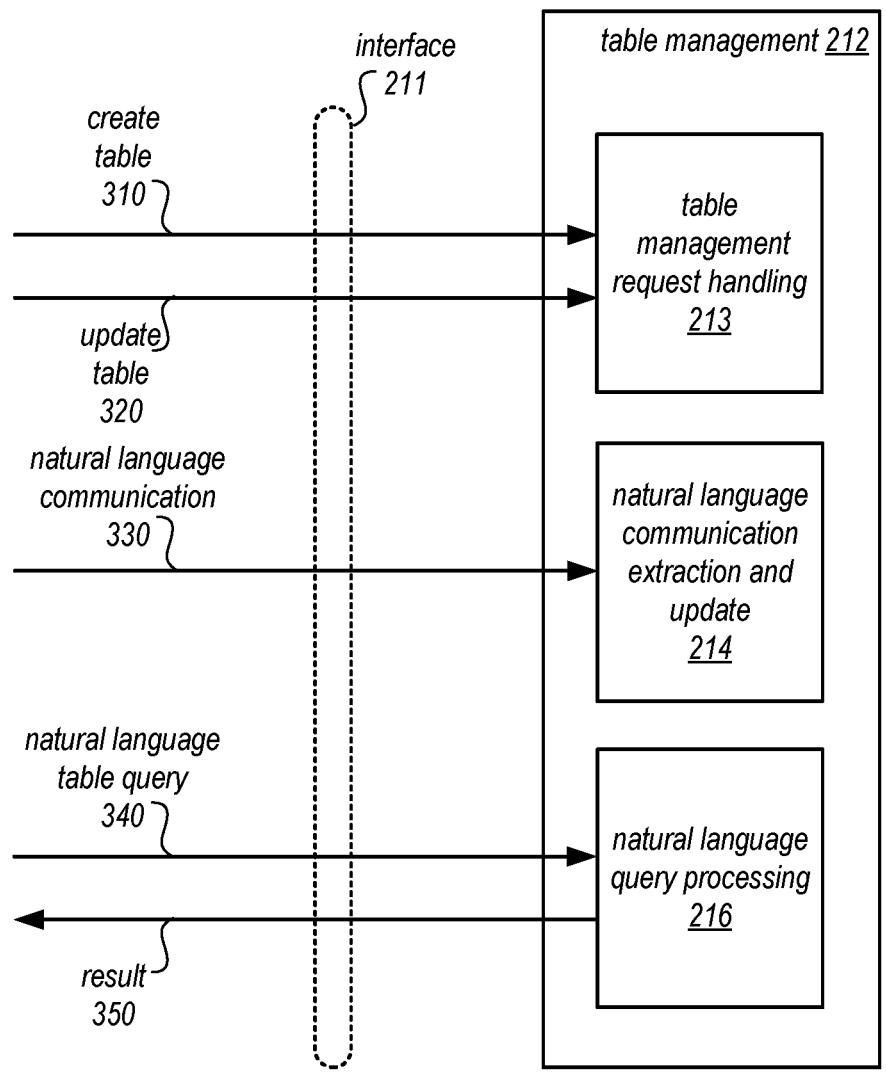
FIG. 3 is a logical block diagram interactions with table management for a data collaboration service, according to some embodiments.

FIG. 3 is a logical block diagram interactions with table management for a data collaboration service, according to some embodiments. As indicated 310, a request may be submitted via interface 211 to create a table to be managed by data collaboration service 210. Table management request handling 213 may receive the request, create the appropriate data structures, metadata, and perform other tasks to initialize the table for subsequent interactions, such as manual edits, querying, and population from extracting natural language data from associated communications. As indicated at 320, requests to update the table 320, including requests that may change values included by natural language communication extraction and update 214, may be accepted and performed by table management request handling 213.

As indicated at 330, natural language communications 330 may be received through interface 211 according to the various techniques discussed below with regard to FIG. 4.

As indicated at 340, a natural language query to one or more tables (or other data sources) may be received via interface 211. Natural language query processing 216 may perform similar techniques to those discussed below with regard to FIG. 4, including pre-processing, tokenization, named entity recognition, and linking to determine a corresponding database or other query to perform with respect to an interface or data store that stores the table. Then, as indicated at 350, a result for the query may be returned.

Figure 4:
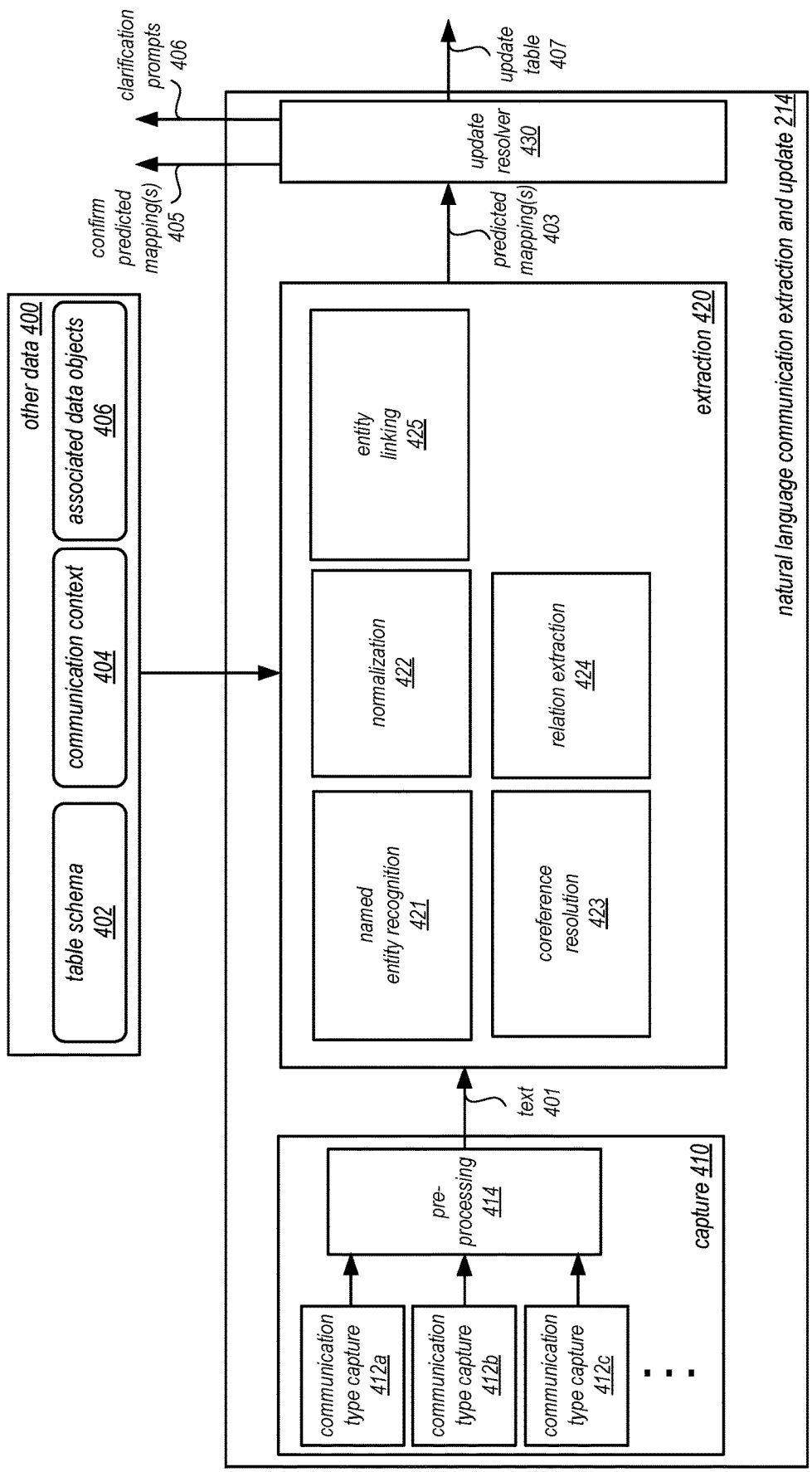
FIG. 4 is a logical block diagram illustrating natural language communication extraction and update for a data collaboration service, according to some embodiments.

FIG. 4 is a logical block diagram illustrating natural language communication extraction and update for a data collaboration service, according to some embodiments. Natural language communication extraction and update 214 may implement different features, subsystems, services or stages, such as capture 410, extraction 420, and update resolver 430 in order to update a table 407 based on natural language data included in a communication.

Capture 410 may support many different types of communication techniques that include natural language data. For example, communication type captures 412a, 412b, and 412c may each correspond to the interface, protocols, endpoints, or other features used to receive (or request) a communication for extraction. For example, different types may include electronic mail (e-mail), text messages (e.g. via SMS), or communication systems, such as chat or message board systems. In some embodiments, communication type capture 412 may be a target or recipient of a communication (e.g., an additional email address added to an email so that natural language communication extraction and update 214 is performed on the email. In some embodiments, a communication type capture 412 may be a plugin or other communication application extension (to which participant communication consents and authorizes, and which also can be disabled by that participant) that enables a record of a communication to be obtained. In some embodiments, a communication type capture 412 may be a non-human participant in the communication (e.g., a chat channel observation agent which is advertised to all participants as a recorded channel).

The capture of natural language data of a communication may be provided to pre-processing 414. Pre-processing 414 may perform various recognition, search, or other extraction techniques to identify relevant text data from the natural language information (e.g., parsing, tokenizing, invoking machine learning models, etc.) as well as preparing the data for extraction and mapping. For example, pre-processing may be able to recognize and extract the relevant data from the "body" of an email, as opposed to the header, greetings, signature or other portions of non-relevant text. In some embodiments, machine learning techniques to recognize certain features in text (e.g., key phrases, entities, and sentiment) may be performed. Data smoothing techniques may also be performed to normalize text, for example, to domain-specific vocabularies.

In some embodiments, non-natural language data objects that are associated with the text may be identified and captured or otherwise obtained. For example, images, linked files, attached documents or other files, and so on, may be also identified and passed to appropriate processing components (not illustrated) in order to perform context extraction. For example, computer vision systems may be used to analyze an image attachment that is a picture of a document, recognize and then extract the text. Similar processing components for other associated data types (e.g., document files, tabular data files (e.g., spreadsheets), links to external hosted data (e.g., websites), etc.) may also be implemented. Text from these other data items may be provided in addition to text 401. In some embodiments, these associated data objects may be captured and then input directly into extraction 420 as part of other data 400, as indicated at 406.

In some embodiments, capture stage 410 may produce text 401 according to an input format. For example, text 401 may be a sequence of messages tagged with metadata. Request and response emails may be formatted, for example, as:

email_thread_id=12897,
    email_thread_coordinator="coordinator@email.com"
    email_id=1
    from="coordinator@email.com"
    to          ="participant-1@email.com, capture1@collaboration.com"
    date time="2022-03-20T19:05:06.930000Z"
    Title="Machine Learning opportunity at XYZ"
    Body="Hi Participant-1,
    I hope you're well?
    I'm Coordinator from the Talent Acquisition team . . . "
    Table="{columns=["Name", "Date-Time", "Status"], rows={
    [ ]
    }"
    email_id=2
    from="participant-1@email.com"
    to          ="coordinator@email.com, capture1@collaboration.com"
    date_time="2022-03-21T10:15:26.930000Z"
    Title="Re: Machine Learning opportunity at XYZ"
    Body="Hi Coordinator,
    I would like to explore this opportunit, here is my availability to chat
    3/25: 9 AM-12 PM, 1 PM-4 PM
    3/29: 1 PM-1: 30 PM, 3 PM-4 PM
    3/30: 9 AM-12 PM, 1 PM-4 PM
    . . . "
    Table="{columns=["Name", "Date-Time", "Status"], rows={
    ["Participant 1", "3/25: 9 AM-12 PM, 1 PM-4 PM", " "]
    ["Participant 1", "3/29: 1 PM-1:30 PM, 3 PM-4 PM", " "]
    ["Participant 1", "3/30: 9 AM-12 PM, 1 PM-4 PM", " "]
    }"

Extraction 420 may implement various techniques to determine values for portions of natural language data in text 401 as well as links to their locations in a table and provide them as predictions, predicted mappings 403. In various embodiments, different machine learning techniques may be implemented to make these predictions. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time.

Various features of machine learning techniques may include different tasks performed as part of a single machine learning model, implementing, for instance, an encoder-decoder based machine learning model, or as a pipeline of various combinations of machine learning models that include named entity recognition 421, normalization 422, reference resolution 423, relation extraction and entity linking 425.

In those embodiments that implement an encoder-decoder machine learning model for extraction 420, there may be a techniques where a given input (e.g., an email thread and table schema and content of the table at time "t") may be translated to a sequence output (e.g., a query language statement or API call, as discussed in the example below). Such a machine learning model may be pre-trained on a large dataset originating from mixed sources and subsequently tuned to the target task on a smaller dataset. The encoder in such an embodiment may computes a representation of the input taking into consideration the context. The embedding of the table, on its turn, takes both column and row position to computing the embedding from the table. This representation may then be fed to the decoder, which computes a list of output queries based on the representation. In some embodiments, both the encoder and decoder are based on transformer models which, as mentioned above, can take advantage of generic data to be pre trained and then later tuned on task specific data. In this specific setting, the data may include pairs of input emails and tables and output update queries. One advantage of this approach is that all necessary latent/intermediate representations to accomplish the task will be automatically built by the model internally from raw data.

Another embodiment of an encoder-decoder machine learning model for extraction 420 may include zero shot learning model, using data only for evaluation, or few shot learning if it is desirable to collect a few examples per domain to tune the model to the task. This approach breaks down the natural language communication extraction task in to a sequence of questions and then uses a pre-trained question and answer (QA) model to answer those questions. For example, the encoder may be perform question formulation, which may determine the different topics/events mentioned in the email and the pieces of text where they are mentioned. For instance, if the email says "Hi Sven, I will attend the Leadership meeting on Monday and I confirm that I can do the Tuesday team meeting", then this question formulation stage may determine that the first trigger word is "attend" in "will attend the Leadership meeting on Monday" and the second is "confirm" in "I confirm that I can do the Tuesday team meeting". Textual entailment (TE): considering a predetermined set of events that it may be expected that the communications to trigger (provide information, confirm, update, correct old information, request alternative, etc.). A TE model may be used to determine for each piece of text extraction in the previous step the event it is intending to trigger. Then, the TE model may be given as input the piece of text together with a prompt saying "This email is about . . . " and fill the gap with the event name. The TE model provides one of three answers "entails/contradicts/neutral" where only the first one indicates the positive case. For example for the trigger words "attend" and "confirm", the events may have Attend and Confirm. Once the trigger events and pieces are determined, then a table that lists the questions for each event may be used. Example questions for the event Attend would be: "Who is attending?", "When are they attending?", "Where are they attending?", etc.

The decoder may act as the Question Answering stage. Similar to the discussion above for question formulation, a pre-trained model may be used (which can be fined tuned to the task and domain to answer the questions provided by question formulation.

In some embodiments, extraction 420 may implement pipelined approach. Note that various aspects of the example stages discussed below may be addressed or implemented as part of the examples given above for encoder-decoder approaches. The pipeline may utilize a named entity recognition model 421, which may take text 401 along with other data 400, such as the associated table 402 (and the schema of the table) and communication context (e.g., a communication thread, such as the first communication or a response to communication sent by a coordinator, as discussed below with regard to FIG. 5). Named entity recognition model 421 may then provide predicted entities for the text. Normalization 422 may then take the corresponding text portions for the predicted entities and apply various techniques to format then in a standard way, as well as transform relative values to actual values. In some embodiments, co-reference resolution 423 may be implemented. Co-reference resolution 423 may, for example, resolve references to their value, such as a reference to "that day" for an event could be mapped to the particular data (e.g., "Monday"). In some embodiments, relation extraction 424 may be implemented to relate entities to one another. These techniques may provide information to entity linking 425 which may also receive other data 400, such as table 402, in order to generate the predicted mappings 403.

Consider the following example message being processed by the example pipeline. the message is "Hi Sameer, What I meant is that I will drive the D&I Event on that day and Tuesday I will do the Team Building one". Then, the NER 421 identifies: "Sameer" as Person, "D&I Event" and "Team Building one" as Event, "Tuesday" as DateTime. Normalization 422 normalizes "D&I Event" to "Diversity and Inclusion Event", "Team Building one" to "Team Building Event", "Tuesday" to "Mar. 15, 2022". Coreference resolution 423 resolves "that day" to "Monday" (which may be supposed to be mentioned in a previous email) which is resolved to "Mar. 14, 2022". The Relation Extraction component 424 will relate "Diversity and Inclusion Event" to "Mar. 14, 2022" and "Team Building Event" to "Mar. 15, 2022". Finally, the entity linking module 425 will take the output of the relation extraction module, the email thread (including meta data around author and recipients), table schema and will produce candidate updates indicating where in the table these new values should be inserted together with a confidence score indicating how confident is the model for each candidate.

In some embodiments, predicted mappings 403 may be a list of none, one, or multiple table change candidates. In some embodiments, the predictions may be specified in a query language format or according to an API (or other protocol) that can be executed to update the table. For instance, for the examples discussed above, such predicted mappings for a SQL output might be:

UPDATE JobID12345_Candidates
SET Confirmed=true
WHERE name="Participant 1"
An example API call might be:

```
{
    {
        "tableID": "JobID12345_Candidates",
        "filter": {
            "rawFilter": " [name] = \"Participant 1\"",
        },
        "tableColumnArns": [
            "Confirmed"
        ],
        "cellContents": [
            {
                "value": "true"
            }
        ]
    }
}
```

Update resolver 430 may determine whether individual predicted mappings satisfy criteria, such as a confidence threshold for automatic application to update the table, as indicated at 407. If not, then the predicted mapping(s) may be confirmed, as indicated at 405. For example, a request may be sent (e.g., via a communication format, or displayed as part of a user interface for the table, as discussed below with regard to FIG. 5). A response may be received (not illustrated) at update resolver, and the update 407 to the table performed (or not if the updated was not confirmed). A similar feature that may be supported are clarification prompts 406, which may be responses that are automatically generated and sent by data natural language communication extraction and update 214, which may identify the ambiguous portion of the communication and prompt a selection of multiple predictions to use as the value, in some embodiments. Like confirmation for predicted mapping(s) 405, responses to clarification prompts may be received and used to select which prediction to use for updating the table 407.

Figure 5:
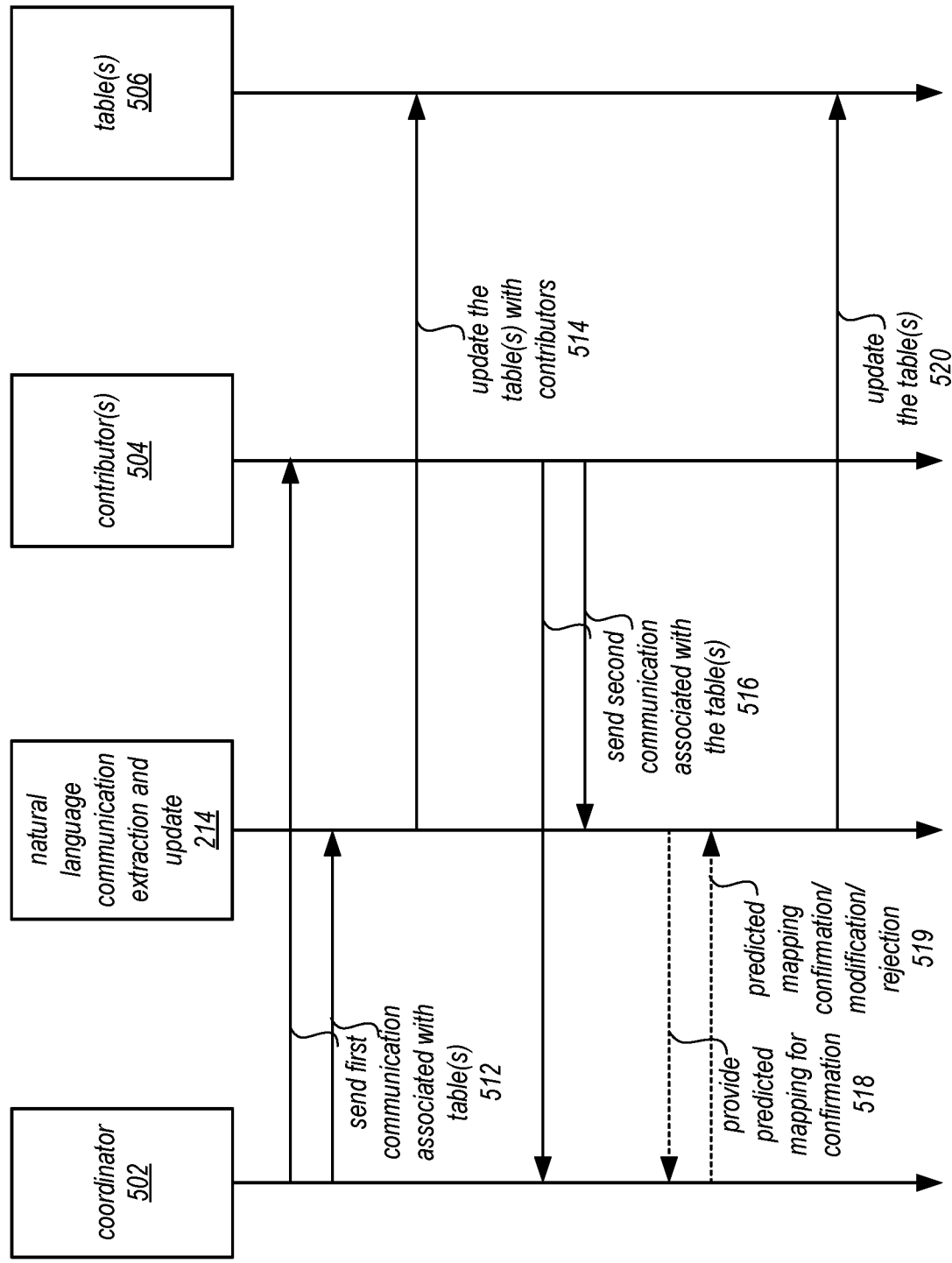
FIG. 5 is a logical block diagram illustrating interactions for a populating a managed table using natural language data from communications, according to some embodiments.

FIG. 5 is a logical block diagram illustrating interactions for a populating a managed table using natural language data from communications, according to some embodiments. Coordinator 502 may be identified as or associated with a table creator, in some embodiments. Coordinator 502 may send a first communication associated with the table, as indicated at 512. The communication may be sent both to one or more recipient(s), such as contributors 504, via various communication techniques as discussed above. The communication may also be sent to natural language communication extraction and update 214.

Natural language communication extraction and update 214 may perform an initial extraction to populate table 506 with contributors to the table (e.g., storing names, user identifiers, such as email addresses, handles, or other information that links a contributor to a row in table 506. Although not depicted, in some embodiments the update may first be confirmed with coordinator 502.

As indicated at 516, contributors 504 may send a second communication associated with the table to coordinator 502. This second communication may, for example, include various other information which may be pertinent to table 506. As discussed above with regard to FIG. 4, and below with regard to FIGS. 6-8, various techniques to search, recognize, extract, and predict value mappings to table 506 may be performed by natural language communication extraction and update 214. Then natural language communication extraction and update 214 may provide, in some scenarios, such as when a confidence threshold for predictions is not exceeded, the predicted mapping(s) for confirmation, as indicated at 518. Coordinator 502 may confirm, modify, or reject the predicted mappings, as indicated 519. For those confirmed or modified mappings, natural language communication extraction and update 214 may update the table 506, as indicated at 520.

Figure 6:
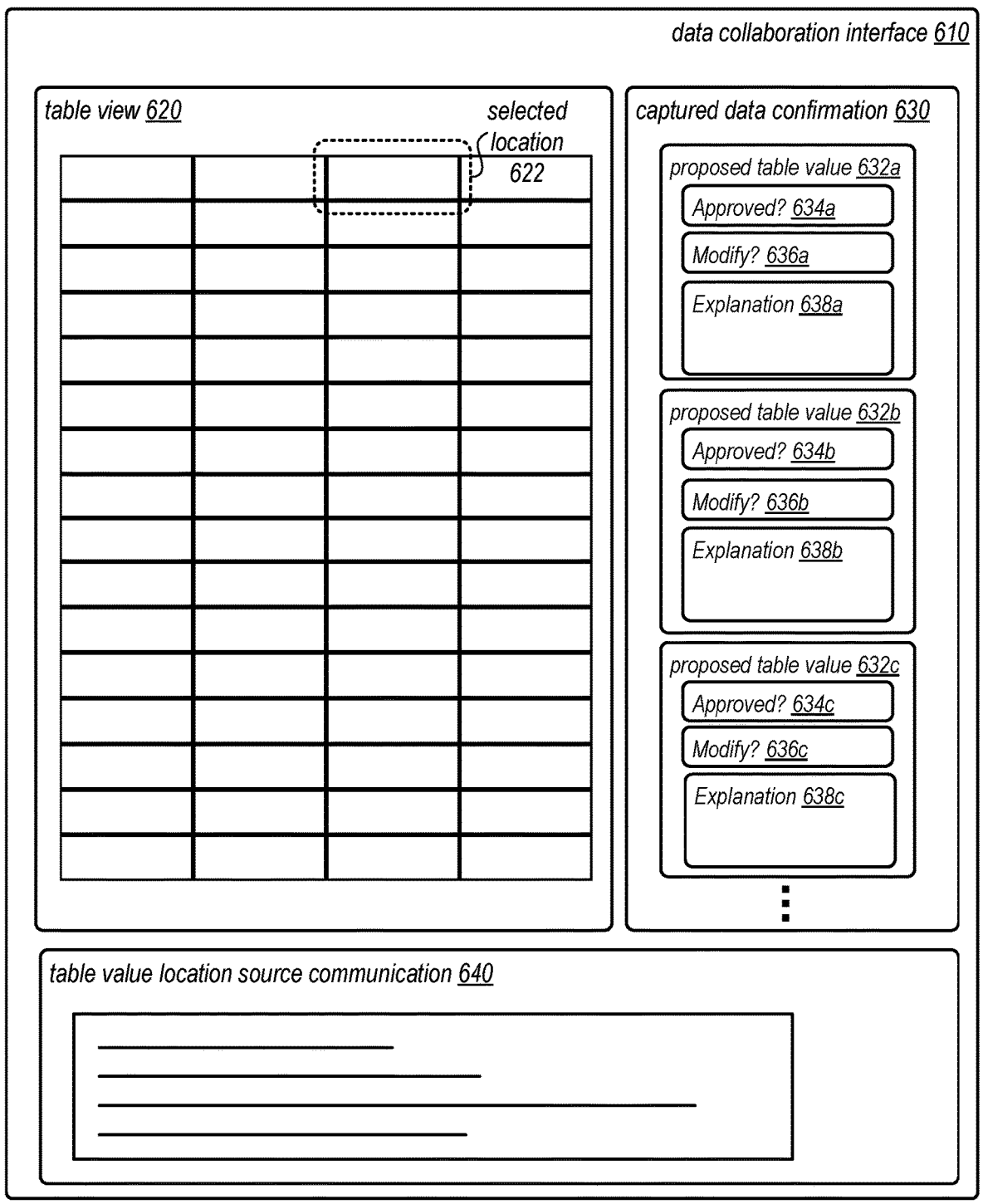
FIG. 6 is an example data collaboration user interface for tables that can be populated from natural language queries, according to some embodiments.

FIG. 6 is an example data collaboration user interface for tables that can be populated from natural language queries, according to some embodiments. Data collaboration interface 610 may implement table view 620, which may be selected or requested via user interface elements (not illustrated). Table view 620 may display accepted and/or proposed table values, in some embodiments. In some embodiments, individual cells or locations of the table may be selected, as indicated at 622. A source of the value may be displayed, such as table value location source communication 640 which may provide a relevant portion (or all) of the communication used to populate the selected location value.

As discussed with regard to FIGS. 4 and 5, confirmation or edits for predicted value mappings to the table may be provided. Captured data confirmation element 630 may provide various user interface elements or formats to display the predicted mappings as proposed table values, such as proposed table values 632a, 632b, and 632c. Elements to approve, such as elements 634a 634b, and 634c may be provided, as well as elements to modify the proposed table value, such as elements 636a, 636b, and 636c. In some embodiments, explanations of the proposals may be provided, such as examples of the source text data or confidence values in the proposed table values, as indicated at 638a, 638b, and 638c.

Figure 7:
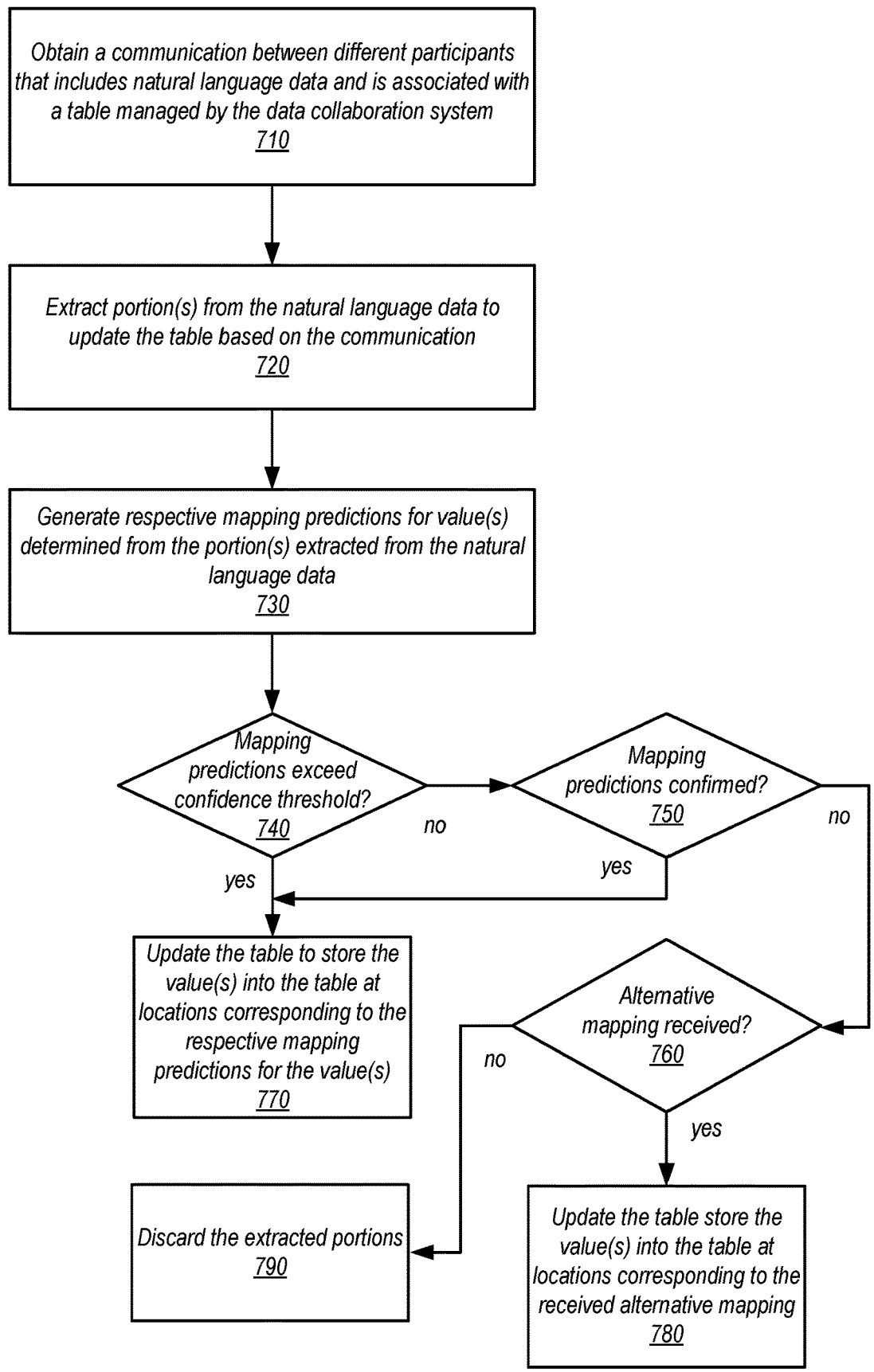
FIG. 7 is a high-level flowchart illustrating various methods and techniques to implement extracting data from natural language communications to populate tables, according to some embodiments.

Although FIGS. 2-6 have been described and illustrated in the context of a provider network implementing a data collaboration service, the various components illustrated and described in FIGS. 2-6 may be easily applied to table management systems or applications which can use natural language communications to populate the tables. As such, FIGS. 2-7 are not intended to be limiting as to other embodiments of a system that may implement table management. FIG. 7 is a high-level flowchart illustrating various methods and techniques to implement extracting data from natural language communications to populate tables, according to some embodiments.

Various different systems and devices may implement the various methods and techniques described below, either singly or working together. For example, a data collaboration service such as described above with regard to FIGS. 2-6 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 710, a communication between different participants that includes natural language data and is associated with a table managed by the data collaboration system is obtained, according to some embodiments. For example, as discussed above with regard to FIG. 3, a table can be created with a specified schema (e.g., multiple columns with respective column names and data types). The association between the table and the communication may, for instance, be indicated in an identifier for the table (or endpoint, tag, or other that associates for capturing the communication). Different types of communications may be captured, as discussed above with regard to FIG. 4. In some embodiments, the association with the table may be determined according to the content of the communication, and not an identifier. For example, as part of the mapping predictions may be a prediction of one table (or some other subset of tables) out of multiple possible tables that exist and could be potentially updated according to this communication.

As indicated 720, one or more portions(s) may be extracted from the natural language data to update the table based on the communication, in some embodiments. For example, a set of regular expression searches for possible values of the table may be performed (e.g., date formats, affirmative or negative indications, and so on). In some embodiments, various preprocessing techniques to remove unnecessary data (e.g., various non-text character symbols (e.g. emojis) or other portions not relevant to a search for values). In some embodiments, machine learning techniques to extract or recognize text for various specific knowledge domains may be performed. Various other techniques, such as those discussed above with regard to FIG. 4 for preprocessing extracted data may be performed. In some embodiments, additional data objects, such as images, linked files, attached documents or other files, may also be used to extract portions of text data or other information used to generate the respective mapping predictions.

As indicated at 730, respective mapping predictions for one or more values determined from the portion(s) extracted from the natural language data may be generated, according to some embodiments. For example, as discussed above with regard to FIG. 4, and below with regard to FIG. 8, a machine learning model (e.g., such as the encoder-decoder models discussed above or the pipelined approach) may be trained to encode the table (and/or schema of the table), and possibly other information, such as the context of the communication within multiple communications (e.g., an email thread), in addition to the extracted portions of the natural language data to predict mappings (e.g., through named entity recognition, normalization, relation extraction, coreference resolution, and entity linking). Note that various other machine learning techniques that can recognize or predict mappings between values and the table may be implemented. For instance, entity recognition could be performed without the table, but instead the table could be used for entity linking alone, or various other combinations. The predicted values may not be the literal values in the text data, in some scenarios, but may be determined or resolved from the text portions, such as the values of the recognized entities (e.g., Date, Name, Decision, etc.). As discussed above, in some embodiments, mapping predictions may be formatted as query language statements or API calls to perform the predicted updates. Confidence scores for the respective mapping predictions may also be provided by the various machine learning techniques.

The mapping predictions may be handled in different ways in order to determine whether automated population or other handling actions should be performed. For example, as indicated at 740, in some embodiments, a confidence threshold may be used to automatically update the table if a respective confidence score for a mapping prediction exceeds the confidence threshold, as indicated by the positive exit from 740. For instance, as indicated at 770, the table may be updated to store the value(s) into the table at location(s) corresponding to the respective mapping predictions for the value(s), in some embodiments.

If the confidence threshold is not exceeded, then as indicated at 750, a determination may be made as to whether the confidence predictions are confirmed, may be made. Confirmed confidence predictions may, for example, received through an interface, as discussed above with regard to FIGS. 4-6. If confirmed, then as indicated at 770, the table may be updated to store the value(s) into the table at location(s) corresponding to the respective mapping predictions for the value(s), in some embodiments.

One, some, or none of the mapping predictions may be confirmed. As indicated at 760, an alternative mapping may or may not be received, in some embodiments. For example, an edit to a determined value (or replacement of the determined value may be made) or its location. In some embodiments, prompts for clarification may be provided which provide different options or requests for information which can be used to determine an alternative mapping. If received, then, as indicated at 780 the table may be updated to store the value(s) into the table at location(s) corresponding to the received alternative for the value(s), in some embodiments. If not, then the extracted portions may not be used to update the table and may be discarded as indicated at 790.

Figure 8:
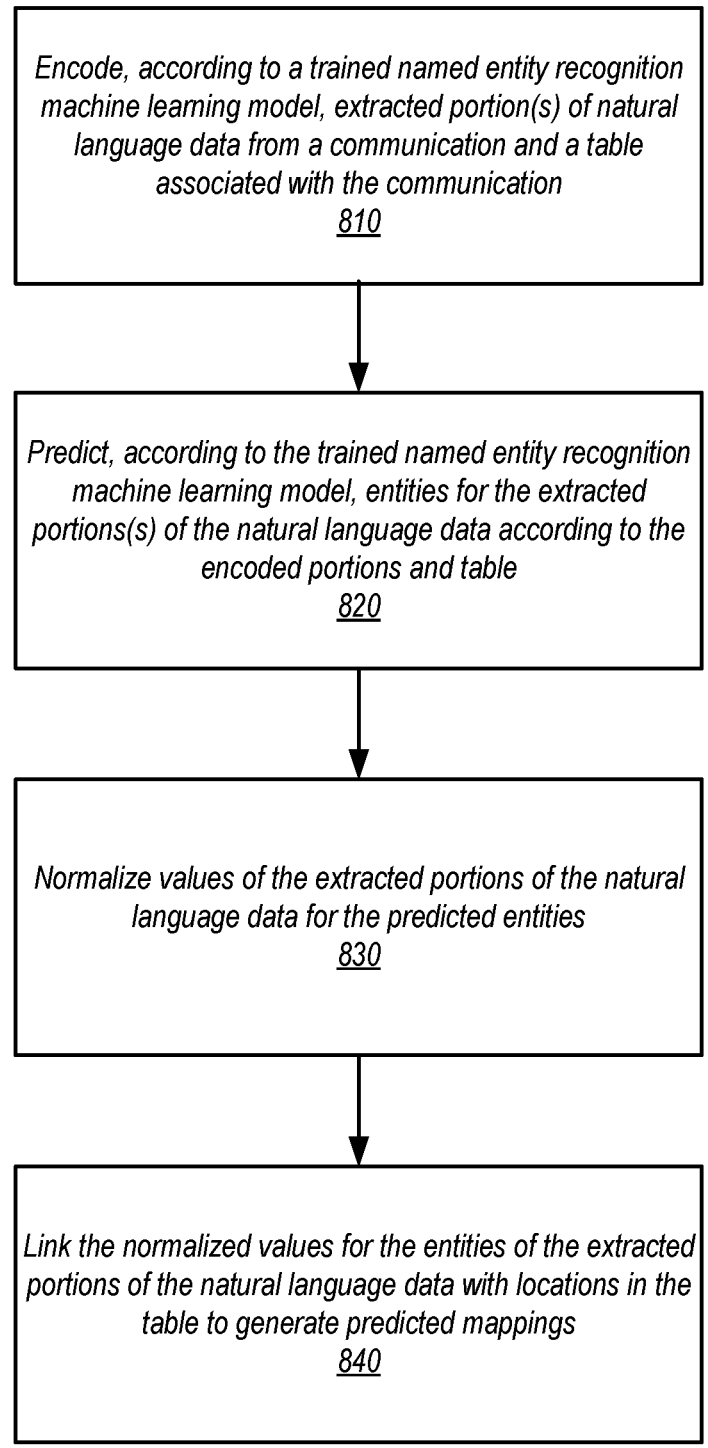
FIG. 8 is a high-level flowchart illustrating various methods and techniques to implementing predicting mappings to table location for values determined from extracted natural language data, according to some embodiments.

As discussed above, different techniques for generating mapping predictions for extracted portions of natural data to a table may be implemented. FIG. 8 is a high-level flowchart illustrating various methods and techniques to implementing predicting mappings to table location for values determined from extracted natural language data, according to some embodiments. As indicated at 810, extracted portion(s) of natural language data from a communication may be encoded with a table associated with the communication, in some embodiments, according to a trained named entity recognition model. For example, the encoded values may be concatenated or placed together in a single input vector.

As indicated at 820, entities for the extracted portions of the natural language data may be predicted for the encoded portions and the table according to the trained named entity recognition model. For example, different entities may correspond to different columns of the table and be determined for each of the different extracted portions. Thus the value of the extracted portion may be correspond to the value of the predicted entity.

As indicated at 830, the predicted entities for the extracted portions of the natural language data may be normalized, in some embodiments. For example, relative values (e.g., next Monday, "I want to work the same shift as X", etc.) may be replaced with determined exact values (e.g., "X/Y/ZZZZ").

As indicated at 840, the normalized values for the entities of the extracted portions may be linked with locations in the table to generate predicted mappings, in some embodiments.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
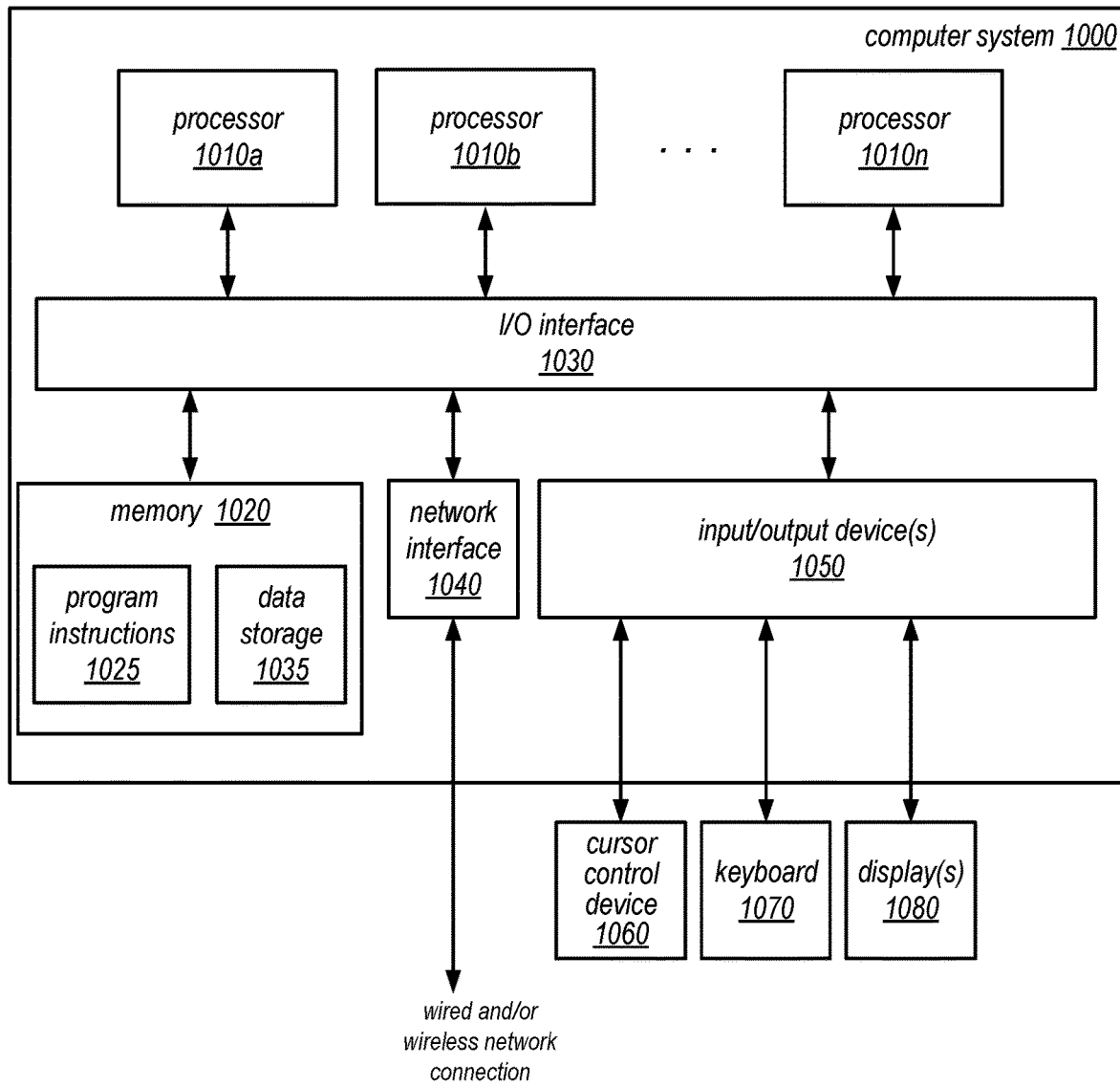
FIG. 9 illustrates an example system configured to implement the various methods, techniques, and systems described herein, according to some embodiments.

Embodiments of automatic selection of data sets for processing natural language queries as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or data storage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a data collaboration system, configured to:
   capture a communication that was sent between different participants, wherein the captured communication comprises natural language data, and wherein the communication is associated with a table created at the data collaboration system;
   extract one or more portions from the natural language data to update the table based on the captured communication;
   determine that the captured communication includes a link to a data object that is external to the captured communication;
   obtain, using the link, at least a portion of the linked data object that is external to the captured communication;

identify a content extraction component according to a data type of the linked data object that is usable to extract further content from the obtained portion of the linked data object;

generate, using a decoder of a transformer machine learning model, that decodes output as respective mapping predictions for one or more values determined based on an embedding of the table, the one or more portions extracted from the natural language data to the table, and the further content extracted from the obtained portion of the data object; and store the one or more values into the table at locations determined based, at least in part, on the mapping predictions to update the table according to the captured communication.

2. The system of claim 1, wherein wherein the transformer model further comprises an encoder that encodes both the one or more portions and the table into the embedding as input to the transformer machine learning model.

3. The system of claim 1, wherein the data collaboration system is further configured to:

provide, via an interface for the data collaboration system, the respective mapping predictions for the one or more values for confirmation;

receive, via the interface, confirmation for at least one of the respective mapping predictions for the one or more values, wherein the at least one respective mapping prediction is the location for one of the one or more values stored into the table.

4. The system of claim 1, wherein the data collaboration system is a data collaboration service offered by a provider network.

5. A method, comprising:

capturing, by a data collaboration system, a communication between different participants, wherein the captured communication comprises natural language data, and wherein the captured communication is associated with a table managed by the data collaboration system;

extracting, by a data collaboration system, one or more portions from the natural language data to update the table based on the captured communication;

determining that the captured communication includes a link to a data object that is external to the captured communication;

obtaining, using the link, at least a portion of the linked data object that is external to the captured communication;

identifying a content extraction component according to a data type of the linked data object that is usable to extract further content from the obtained portion of the linked data object;

generating, using a decoder of a transformer machine learning model, respective mapping predictions for one or more values based on an embedding of the table, the one or more portions extracted from the natural language data to the table, and the further content extracted from the obtained portion of the data object; and updating the table to store the one or more values into the table at locations determined based, at least in part, on the respective mapping predictions.

6. The method of claim 5, wherein the transformer model further comprises an encoder that encodes both the one or more portions and the table into the embedding as input to the transformer machine learning model.

7. The method of claim 5, wherein at least one of the one or more portions is usable to generate a respective mapping prediction is determined from the at least one portion extracted from the natural language data for a different table.

8. The method of claim 5, further comprising:

providing, via an interface for the data collaboration system, the respective mapping predictions for the one or more values for confirmation;

receiving, via the interface, confirmation for at least one of the respective mapping predictions for the one or more values, wherein the at least one respective mapping prediction is the location for one of the one or more values stored into the table.

9. The method of claim 5, further comprising:

providing, via an interface for the data collaboration system, the respective mapping predictions for the one or more values for confirmation;

receiving, via the interface, a modification to at least one of the respective mapping predictions for the one or more values, wherein the modified at least one respective mapping prediction is usable to update the table.

10. The method of claim 5, further comprising:

receiving, via an interface of the data collaboration system, one or more requests to create the table, wherein the one or more requests specify a schema of the table, wherein the generation of the respective mapping predictions based, at least in part, on the schema of the table.

11. The method of claim 5, wherein the captured portion of the data object is an image and wherein the identified context extraction component is text recognition that is applied to the image to obtain further natural language for updating the table.

12. The method of claim 5, wherein the generation of the respective mapping predictions selects the table out of a plurality of possible tables to be updated.

13. The method of claim 5, wherein updating the table to store the one or more values into the table is performed after determining that respective confidence scores for the respective mapping predictions exceed a confidence threshold.

14. One or more non-transitory, computer-readable storage media, storing program instructions that when executed on or across one or more computing devices cause the one or more computing devices to implement:

capturing a communication between different participants, wherein the captured communication comprises natural language data, and wherein the captured communication is associated with a table managed by the data collaboration system;

extracting one or more portions from the natural language data to update the table based on the captured communication;

determining that the captured communication includes a link to a data object that is external to the captured communication;

obtaining, using the link, at least a portion of the linked data object that is external to the captured communication;

identifying a content extraction component according to a data type of the linked data object that is usable to extract further content from the obtained portion of the linked data object;

generating, by the data collaboration system using a decoder of a transformer machine learning model, respective table location predictions for one or more values determined based on an embedding of the table, the one or more portions extracted from the natural language data to the table, and the further content extracted from the obtained portion of the data object; and storing, by the data collaboration system, the one or more values into the table at locations determined based, at least in part, on the respective table location predictions.

15. The one or more non-transitory, computer-readable storage media of claim 14, wherein the transformer model further comprises an encoder that encodes both the one or more portions and the table into the embedding as input to the transformer machine learning model.

16. The one or more non-transitory, computer-readable storage media of claim 14, storing further program instructions that when executed by the one or more computing devices, cause the one or more computing devices to further implement:

providing, via an interface for the data collaboration system, the respective table location predictions for the one or more values for confirmation;

receiving, via the interface, confirmation for at least one of the respective table location predictions for the one or more values, wherein the at least one respective table location prediction is the location for one of the one or more values stored into the table.

17. The one or more non-transitory, computer-readable storage media of claim 14, storing further program instructions that when executed by the one or more computing devices, cause the one or more computing devices to further implement:

receiving, via an interface of the data collaboration system, one or more requests to create the table, wherein the one or more requests specify a schema of the table, wherein the generation of the respective mapping predictions based, at least in part, on the schema of the table.

18. The one or more non-transitory, computer-readable storage media of claim 14, storing further program instructions that when executed by the one or more computing devices, cause the one or more computing devices to further implement:

providing, via an interface for the data collaboration system, the respective table location predictions for the one or more values for confirmation;

receiving, via the interface, a modification to at least one of the respective table location predictions for the one or more values, wherein the modified at least one respective table location prediction is usable to update the table.

19. The one or more non-transitory, computer-readable storage media of claim 14, wherein the captured communication is a mobile device communication that is also sent to the data collaboration system.

20. The one or more non-transitory, computer-readable storage media of claim 14, wherein the data collaboration system is a data collaboration service offered by a provider network.

* * * * *